United States Patent [19]

Tamai et al.

[11] Patent Number: 5,594,291
[45] Date of Patent: Jan. 14, 1997

[54] VIBRATION DEVICE FOR VIBRATION DRIVEN MOTOR

[75] Inventors: Jun Tamai; Yutaka Maruyama; Ichiro Chiba, all of Yokohama, Japan

[73] Assignee: Canon Kabushiki Kaisha, Tokyo, Japan

[21] Appl. No.: 365,035

[22] Filed: Dec. 28, 1994

Related U.S. Application Data

[63] Continuation of Ser. No. 87,858, Jul. 9, 1993, abandoned.

[30] Foreign Application Priority Data

Jul. 16, 1992 [JP] Japan .................. 4-189664

[51] Int. Cl.$^6$ .................................. H01L 41/08
[52] U.S. Cl. .................................. 310/323
[58] Field of Search .................... 310/323, 325, 310/328

[56] References Cited

U.S. PATENT DOCUMENTS

| | | | |
|---|---|---|---|
| 3,891,869 | 6/1975 | Scarpa | 310/323 |
| 4,180,398 | 12/1979 | Parikh | 75/157.5 |
| 4,359,659 | 11/1982 | Phillips | 310/335 |
| 4,753,579 | 6/1988 | Murphy | 417/322 |
| 4,965,482 | 10/1990 | Ohnishi et al. | 310/323 |
| 4,981,405 | 1/1991 | Mountford | 73/644 |
| 5,051,647 | 9/1991 | Uchikawa et al. | 310/323 |
| 5,115,161 | 5/1992 | Myohga et al. | 310/323 |
| 5,122,700 | 6/1992 | Tamai et al. | 310/323 |
| 5,124,611 | 6/1992 | Tamai et al. | 310/317 |
| 5,148,075 | 9/1992 | Shinasaki | 310/323 |
| 5,157,300 | 10/1992 | Kataoka et al. | 310/323 |
| 5,187,406 | 2/1993 | Seki | 310/323 |
| 5,231,325 | 7/1993 | Tamai et al. | 310/323 |

FOREIGN PATENT DOCUMENTS

| | | | |
|---|---|---|---|
| 63-202188 | 12/1988 | Japan | H02N 2/00 |
| 4091670 | 3/1992 | Japan | H02N 2/00 |

OTHER PUBLICATIONS

European Search Report.

*Primary Examiner*—Thomas M. Dougherty
*Attorney, Agent, or Firm*—Fitzpatrick, Cella, Harper & Scinto

[57] ABSTRACT

A vibration driven motor including a vibrating member made of a metallic material which is treated so that the elastic modulus is the same or substantially the same in respective vibration directions of the vibrations generated therein, and a rotor brought into contact with the vibrating member to be driven thereby.

12 Claims, 11 Drawing Sheets

α-PHASE  β-PHASE  0.05mm

FIG. 2(b)

α-PHASE  β-PHASE  0.05mm

VIBRATION DEVICE FOR VIBRATION DRIVEN MOTOR

This application is a continuation of application Ser. No. 08/087,858 filed Jul. 9, 1993, now abandoned.

BACKGROUND OF THE INVENTION

1. Field of the Invention

The present invention relates to an ultrasonic motor which includes a vibrator and a moving member in pressure contact with the vibrator, in which circular vibrations are formed in the vibrator by combining at least two vibrations excited therein using an electro-mechanical energy converter, such as a piezoelectric element, and in which the moving member is moved relative to the vibrator to obtain mechanical energy.

2. Description of the Related Art

Figure 11:
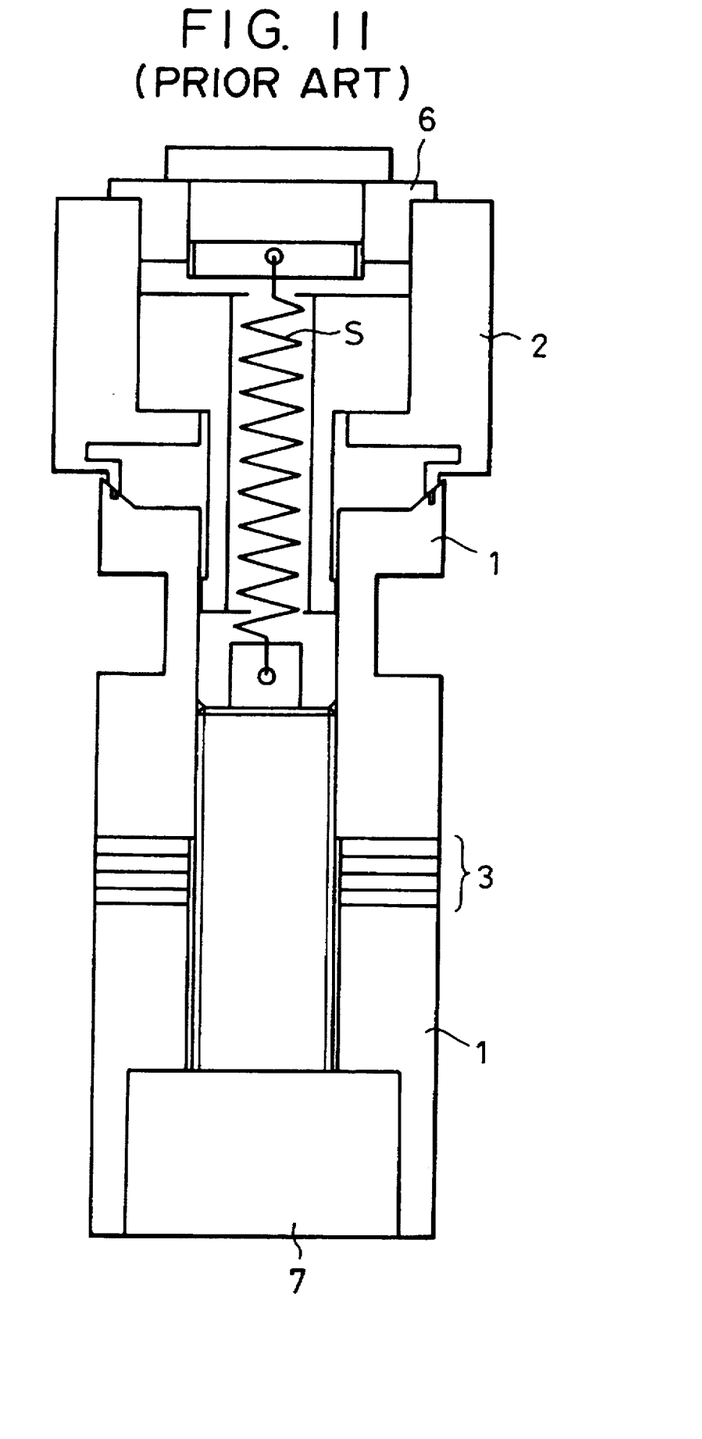
FIG. 11 is a drawing illustrating an ultrasonic motor using a conventional material.

The applicant of the present invention has proposed in Japanese Patent Application No. 2-206241 an ultrasonic motor shown in FIG. 11. In FIG. 11, reference numeral 11 denotes a vibrator made of a metallic material, and comprising a plurality of piezoelectric elements 3 which are interposed between cylindrical metallic blocks and which are held and fixed therebetween by fastening the metallic blocks using a bolt 7. In the vibrator 1, two bending vibrations (bending modes) intersecting at right angles are excited by applying AC voltages having different phases to the drive piezoelectric elements of the piezoelectric elements, and are combined to form a circular or elliptical rotational driving vibration at the tip of the vibrator 1. Namely, the application of AC signals produces a plurality of vibrations having a phase difference in time therebetween in a plurality of planes in the vibrator 1. The vibrator 1 has a peripheral groove formed in the upper portion thereof so as to increase the displacement of the drive vibration.

Reference numeral 2 denotes a rotor brought into pressure contact with the vibrator 1 by a pressure spring S to obtain a frictional driving force. Reference numeral 6 denotes a bearing for rotatably supporting the rotor 2.

The vibrator of the ultrasonic motor configured as described above is made of a material, e.g., free-cutting brass of JIS C3601 consisting of 59 to 63% copper, 1.8 to 3.7% lead, and the balance Zn, which can easily be mechanically processed and which preferably exhibit low periodic damping.

However, in the ultrasonic motor having the above structure, in order to form an ideal circular movement at the axis of the vibrator by combining the two excited vibration modes (sine mode and cosine mode) and transmit a constant frictional driving force to the rotor in pressure contact therewith, it is necessary to match the resonance frequencies of the two vibration modes. Otherwise, nonuniformity occurs in the locus of the elliptical vibration formed on the peripheral drive surface of the vibrator 1 by the driving vibration on the drive surface thereof, as viewed from the side of the vibrator 1. Thus, a constant frictional driving force cannot be transmitted to the rotor, thereby decreasing the efficiency of the motor.

Although attempts have been made to match the resonance frequencies of the two vibration modes in the vibrator, it is difficult to match the resonance frequencies of both vibration modes.

As a result of an examination of the cause of this mismatch between the resonance frequencies, the inventors have found that the mismatch between the resonance frequencies is caused by a mismatch between the natural frequencies of the respective vibration modes in the vibrator.

In conventional systems, if the natural frequencies of the respective vibrations in the two vibration systems intersecting at right angles are different, then, a notch may be formed in a portion of the vibrator, or a mass may be added thereto in order to match the natural frequencies. The applicants of this invention previously have filed an application in which such an external load is provided on a vibrator.

However, it is a drawback to provide such an external load because of differences between the structural and operating conditions of various vibrators. It is thus desirable to match the natural frequencies of the two vibrations intersecting at right angles by appropriately selecting a material for the vibrator.

The inventors thus performed research on the metallic material of a vibrator with respect to not only the composition of the metallic material but also the microstructure thereof. As a result, the inventors found that the mismatch between the natural frequencies is caused by the anisotropy of the crystal structure, particularly the anisotropy of the Young's modulus, which is possessed by the metallic material of the vibrator.

Another type of ultrasonic motor is disclosed in Japanese Utility Model Laid-Open No. 63-202188.

In this ultrasonic motor, a vibration in a longitudinal mode and a vibration in a torsional mode are axially excited in a vibrator, and are combined to form a circular vibration in the vibrator. This type of vibrator is also required to have a match between the resonance frequencies of the respective vibration modes.

However, this ultrasonic motor has the same drawback as that of the vibrator of the type in which bending vibrations are combined.

SUMMARY OF THE INVENTION

Accordingly, an object of the present invention is to overcome various drawbacks of conventional motors, and to provide an ultrasonic motor which permits a match between the resonance frequencies of two vibrations supplied for driving without providing an external load or the like on a vibrator.

In accordance with one aspect of the present invention, an ultrasonic motor comprises a vibrator which is made of a metallic material that is treated so that the elastic modulus is the same or substantially the same in vibrations in two directions intersecting at right angles; and a rotor which is driven by the vibrator.

Specifically, in one aspect, the present invention relates to a vibration driven actuator or a vibration driven system using the actuator as a driving source. The actuator includes a metallic vibrating member for generating therein a plurality of vibration waves having respective vibration directions. The vibrating member is formed of a metallic material having an elastic modulus deviation of 0.6% or less between respective vibration directions.

In another aspect, the present invention relates to a vibration driven motor or actuator including a metallic vibrating member for generating a plurality of vibrations having a phase difference in time therebetween in a plurality of planes, and a rotor arranged to be rotated by the vibrations generated in the vibrating member. The vibrating member is formed of a metallic material having an elastic modulus deviation of 0.6% or less between respective vibration directions.

In yet another aspect, the present invention relates to a method of manufacturing a vibration member for a vibration driven actuator, including the steps of forming a metallic vibration member, and repeatedly annealing the vibration member to achieve an elastic modulus deviation of 0.6% or less between vibration directions of respective plural vibration waves generated in the vibration member.

In a further aspect, the present invention relates to a method for manufacturing a vibration member for a vibration driven actuator, including the steps of forming a metallic vibration member and repeatedly annealing and cold-drawing the vibration member to achieve an elastic modulus deviation of 0.6% or less between vibration directions of respective plural vibration waves generated in the vibration member.

In accordance with another aspect of the present invention, there is provided a silent system using the above ultrasonic motor or a vibration driven motor as a driving source.

In two types of ultrasonic motors, including a first type in which a vibration in the longitudinal mode and a vibration in the torsional mode in the axial direction of the vibrator are combined, and a second type in which vibrations in a bending mode are combined, consideration must be given to the anisotropy of the natural frequency of the metallic material used in the vibrator of the ultrasonic motor. The natural frequency closely depends upon the Young's modulus of the material, and more particularly, the Young's modulus is a direct factor.

Namely, in an ultrasonic motor of the type in which vibrations in two different vibration modes, such as the longitudinal mode and the torsional mode, are combined in the vibrator, although the Young's modulus of the metallic material of a vibrator which constitutes the ultrasonic motor may have anisotropy, material samples must have a stable anisotropy. That is, if the vibrators have the same shape and processing accuracy, then it is necessary to ensure that the resonance frequency in the longitudinal mode and the resonance frequency in the torsional mode always have a substantially constant relation.

On the other hand, if the vibrator of a conventional ultrasonic motor employs vibrations in respective bending vibration modes in two directions, as shown in FIG. 11, then it is necessary to ensure that the metallic material used for forming the vibration member has a Young's modulus with high concentricity with the axis of the vibration mode.

Known methods for producing a metallic material which forms the vibrator of a commercially available ultrasonic motor include a rolling method and a drawing (extrusion) method. Both methods produce crystal orientation anisotropy which depends upon the material components and the processing method. For example, in a rolled plate, the Young's modulus in the rolling direction is different from the Young's modulus in a direction vertical thereto, and the degree of difference depends upon the material components, the draft, the annealing temperature and the like.

On the other hand, in a drawn bar (pipe), the Young's modulus in the axial direction is different from the Young's modulus in the radial direction, and the degree of difference depends upon the material components and production conditions, as in the rolled plate.

Furthermore, even when a metallic block of the vibrator is produced by a processing method such as sintering, forging, casting or the like, isotropy of the Young's modulus cannot be easily attained due to the anisotropy of the powder form, the formation of a fiber flow in the pressing direction, the anisotropy of the solidified texture and so on. There is also a drawback in that, for example, the Young's modulus of the extruded bar is different in the radial direction if the crystal grain size is excessive large.

When the crystal grains of a metallic material used have a fine spherical form, therefore, the Young's modulus (elastic modulus) is substantially the same in the same production direction (for example, the radial direction of an extruded round bar), and the ratio of Young's modulus in the rolling direction to that in the direction vertical thereto is constant.

Thus, in the present invention, the crystal grains are made finely spherical by appropriately selecting the material components and production conditions, thereby obtaining a stable natural frequency.

BRIEF DESCRIPTION OF THE DRAWINGS

FIG. 2(a) is a microphotograph (×400) of a section of high tensile brass, and FIG. 2 (b) is a microphotograph (×400) of a section of free-cutting FIG. 3 (a) is a sectional view showing the results of hardness tests of high tensile brass.

FIGS. 6 (AA) and 6 (AB) are charts respectively showing the spectrum of a primary bending vibration mode of high tensile brass, which was obtained by the sounding method, and a relation between the spectrum and the admittance of a vibrator which was obtained by an impedance analyzer; and FIGS. 6(BA) and 6(BB) are charts respectively showing the spectrum of a primary bending vibration mode of free-cutting brass, which was obtained by the sounding method, and a relation between the spectrum and the admittance of a vibrator which was obtained by an impedance analyzer;

DESCRIPTION OF THE PREFERRED EMBODIMENTS

Figure 1:
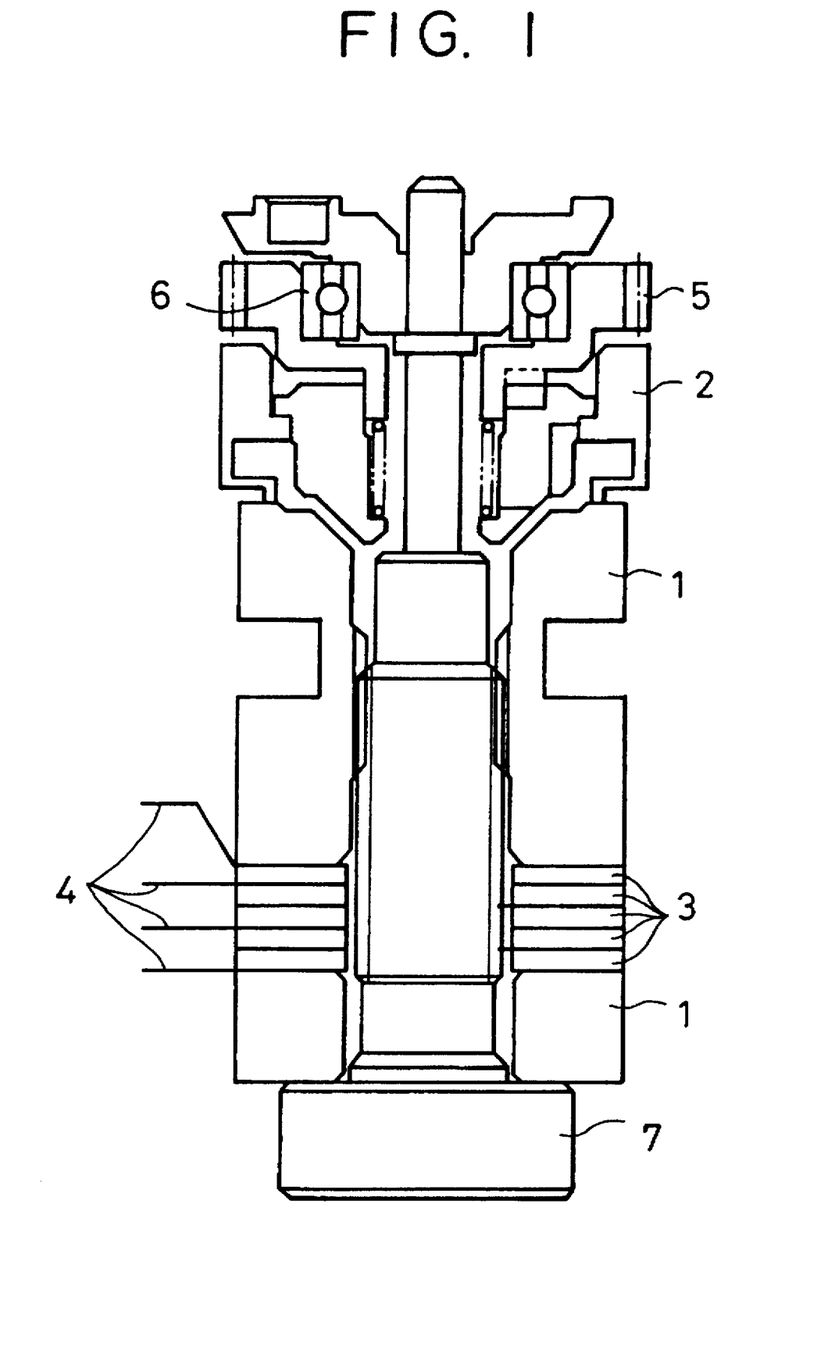
FIG. 1 is a sectional view illustrating an ultrasonic motor in accordance with an embodiment of the present invention.

FIG. 1 is a sectional view illustrating an ultrasonic motor in accordance with an embodiment of the present invention.

The principles of driving an ultrasonic motor according to the present embodiment are known, as described in detail in Japanese Patent Application No. 2-206241 (disclosing an example of conventional motors), and will not be described in detail below.

In the ultrasonic motor shown in FIG. 1, AC voltages having different phases are applied to electrode plates 4 from a driving circuit (not shown). The drive operation is controlled by detecting the vibration state of a piezoelectric sensor element disposed among the plurality of piezoelectric elements 3. In this manner, a rotational movement is generated in vibrator 1 by combining two bending vibrations intersecting at right angles. The rotational movement generated is transmitted to a rotor 2 and an output gear supported by a bearing 6.

Figures 2A, 2B:
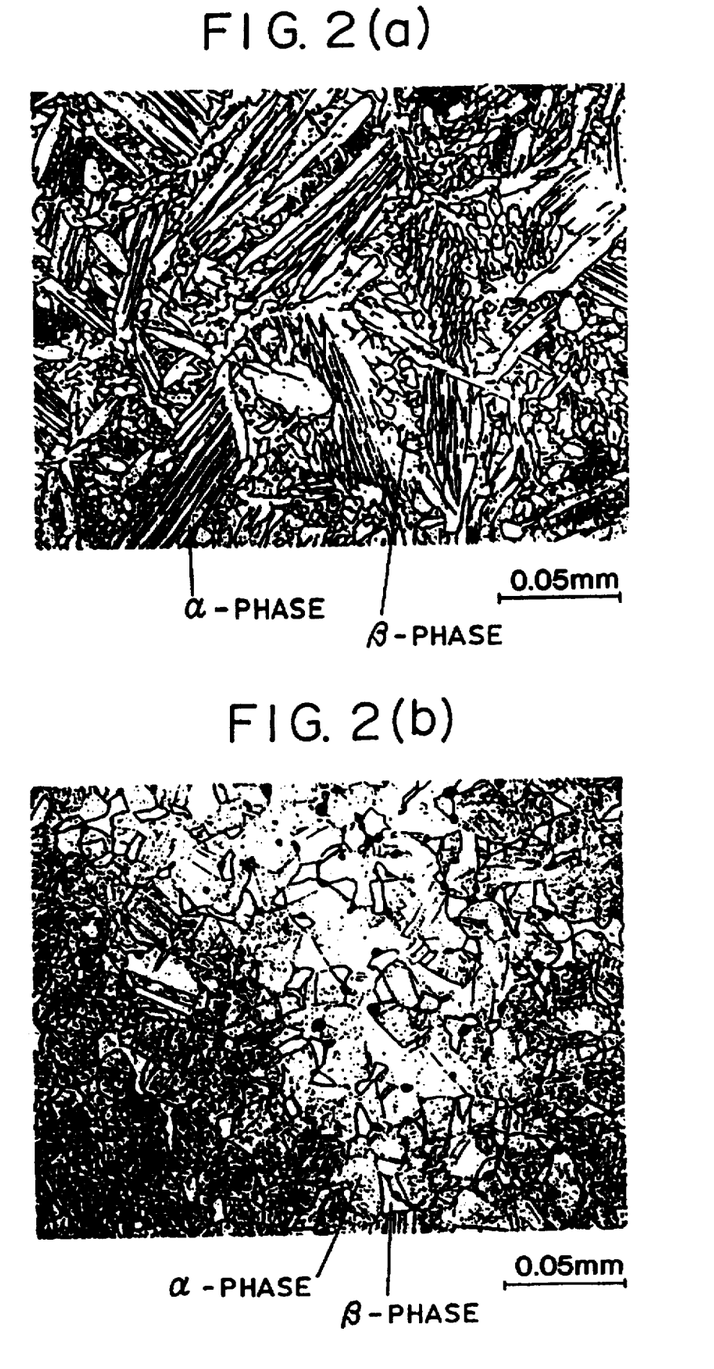

In this ultrasonic motor, a drawback exists in the way of substantially matching the resonance frequencies of the two bending vibrations intersecting at right angles. In this embodiment, a metallic block member 1 which forms a vibrator is made of free-cutting brass (JIS C3604). Although the metallic block material is generally made of high tensile brass which is 6-4 brass, as the free-cutting brass, there is a drawback in that the resonance frequencies of the two bending vibrations intersecting at right angles do not match, i.e., a frequency deviation exists. The brass materials were thus examined with respect to the anisotropy of their crystal structures. FIGS. 2(a) and 2(b) respectively show the sectional microstructures of a high tensile brass round bar which is commercially used, and a free-cutting brass round bar which is produced by repeatedly work hardening and annealing a metal brass sample in accordance with an embodiment of the present invention.

In the high tensile brass, a coarse needle-like α-phase is separated from a β-phase. On the other hand, in the free-cutting brass, fine spherical crystal grains having a size of about 0.02 mm are produced. This structural difference between the high tensile brass and the free-cutting brass is caused by the pressure of elements such as Al, Mn and the like which are contained in small amounts in the high tensile brass. However, this difference is caused by the repeated work hardening and annealing (recrystallization) process in the production method of the present invention, rather than the elements such as Al, Mn and the like, per se. By experimentation, it was found that the grain size of the fine spherical crystal grains is preferably 0.05 mm or less.

Figure 3A:
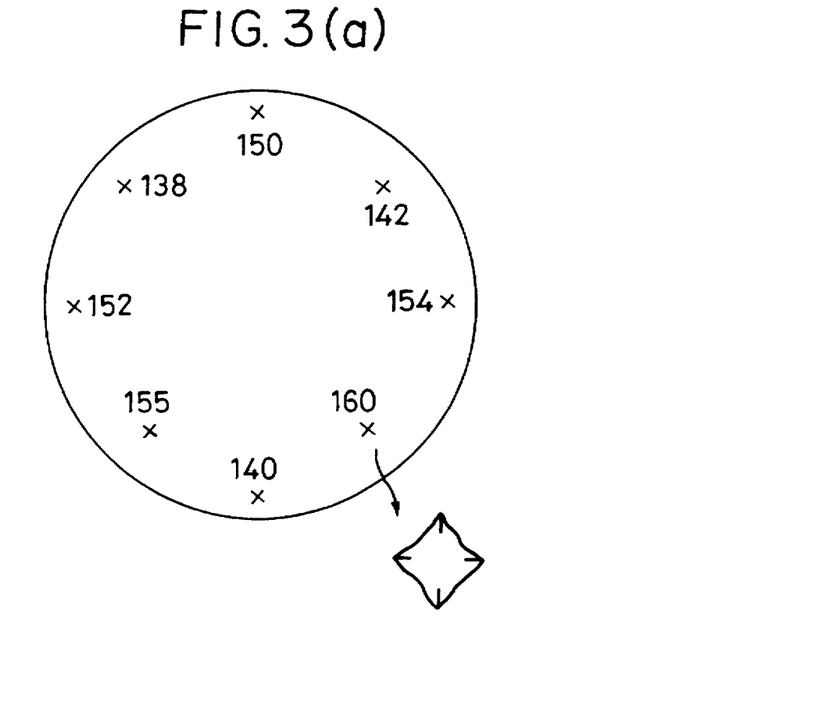
Figure 3B:
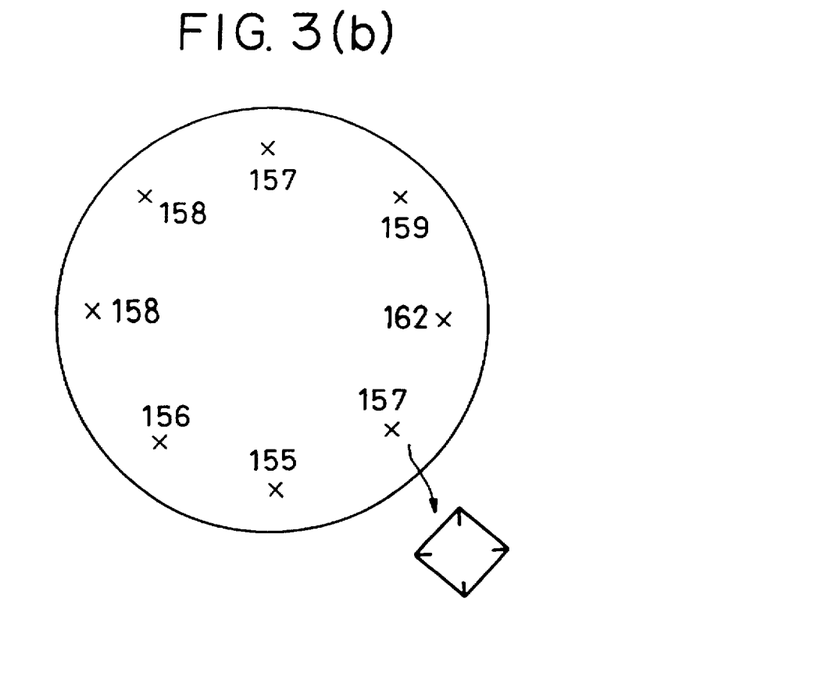
FIG. 3(b) is a sectional view showing the results of hardness tests of free-cutting brass.

FIGS. 3(a) and 3(b) show the results obtained by testing the hardness of the peripheral portions in sections of the high tensile brass and the free-cutting brass, respectively, using a Vickers hardness tester (load 50 gf). The high tensile brass shows hardness variations greater than that of the free-cutting brass, and frequently shows a distortion of the compressed form. This indicates that the high tensile brass has large differences in deformation resistance from the microscopic viewpoint. It was also found that the Vickers hardness distribution of the free-cutting brass has a variation of ±5% or less.

The frequency deviation of a single metallic material was examined by the method below.

Figure 4:
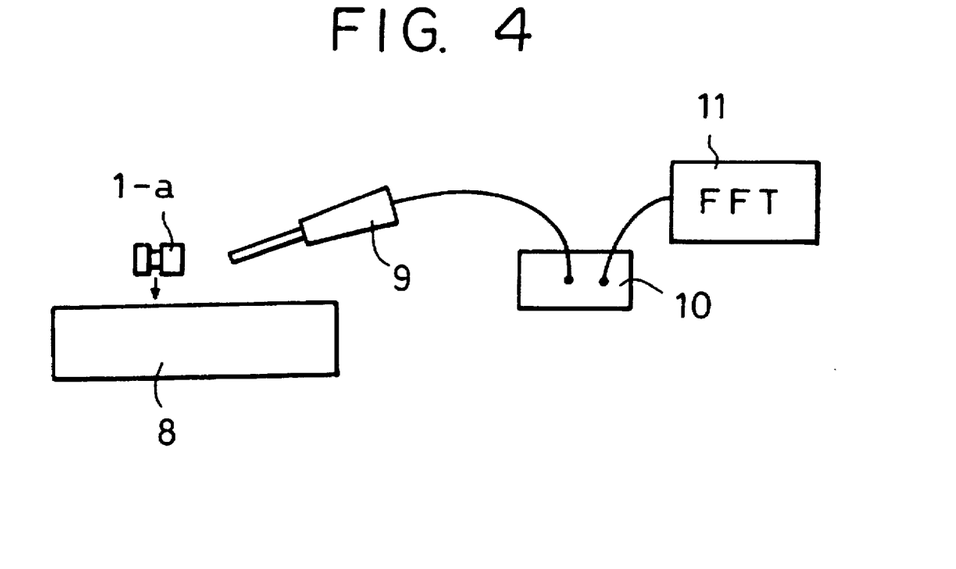
FIG. 4 is a schematic drawing illustrating an apparatus for measuring a frequency deviation by a sounding method.
Figure 5:
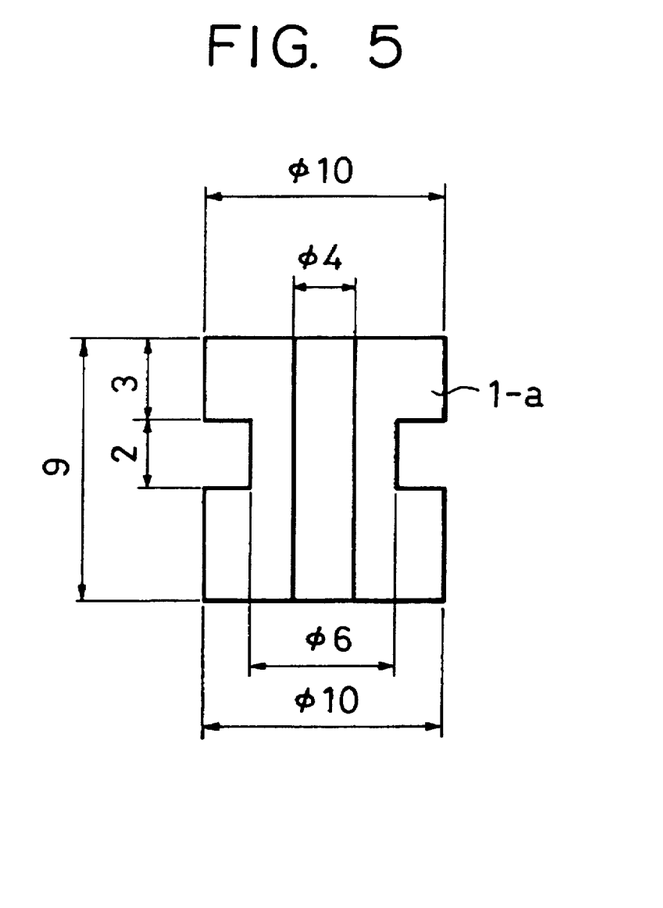
FIG. 5 is a drawing illustrating a dummy sample used for the sounding method.

A dummy sample 1-a as shown in FIG. 5, having a shape similar to that of the metallic block member of a vibrator (external diameter=10 mm; internal diameter=4 mm; length=9 mm; diameter of the narrow portion=6 mm; length of the narrow portion=2 mm; distance of the narrow portion from the upper end=3 mm) was formed for each of various materials. Each dummy sample was dropped on a bottom board 8, and the sound generated was gathered by a high-sensitivity directional microphone 9, was amplified by an amplifier 10, and then was analyzed by an FET (high-speed Fourier transform device) 11, as shown in FIG. 4. This method is referred to as the "sounding method" hereinafter.

Figure 6:
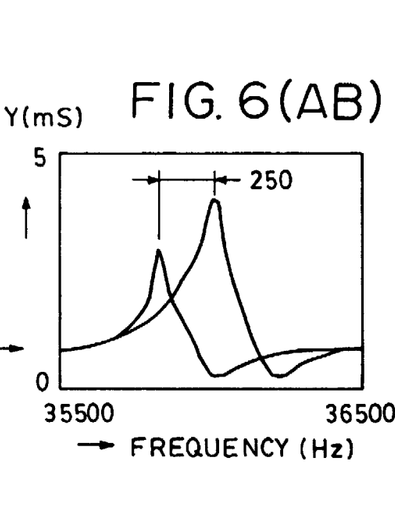

One conventional material (high tensile brass) shows two spectral peaks at 50486 Hz and 50817 Hz, as shown in FIG. 6(AA). This illustrates that the lowest order bending vibration mode of the dummy sample has a natural frequency of 50817 Hz in the stiffer direction and 50486 Hz in the less stiff. If such a material is used as a material for the vibrator of an ultrasonic motor, then the natural vibrations in two the vibration directions intersecting at right angles deviate from each other in the vibrator incorporated in an electro-mechanical energy converter such as a piezoelectric element or the like in correspondence with a frequency difference (frequency deviation) of 331Hz.

FIGS. 6(AB) and 6(BB) show the relations between the frequency and admittance of vibrators formed of high tensile brass and free-cutting brass, respectively, which were measured by an impedance analyzer (YHP4194A).

The vibrator formed of high tensile brass which shows a frequency deviation of 331 Hz in the sounding method also shows a frequency deviation of 250 Hz in the measurement using the impedance analyzer. On the other hand, the free-cutting brass sample shows only one peak at 51212 Hz in the sounding method, as shown in FIG. 6(BA), and the vibrator formed of the free-cutting brass also shows a frequency deviation of only 20 Hz, as shown in FIG. 6(BB). The results of this examination revealed that a frequency deviation of 20 Hz is caused by dimensional in accuracies of other components of the vibrator.

As described above, it was found that the frequency deviation of a vibrator is greatly affected by the crystal structure anisotropy of the metallic block material used.

It was also found from many experimental results that a vibrator produced by repeatedly work hardening and annealing the material in accordance with a method of the present invention has a degree of frequency deviation, i.e., frequency deviation/natural frequency, that is less than 0.3%, and that the natural frequencies of vibrations in two directions intersecting at right angles in the vibrator are substantially the same.

If the degree of frequency deviation is converted to elastic modulus, it can be said that the deviation of elastic modulus between the two vibration directions in the vibrator is preferably less than 0.6%.

Namely, assuming that the young's modulus (elastic modulus) is E (kg/mm$^2$), the density is ρ (kg), and the natural frequency is f (Hz), in the case of two bending vibrations, the following expression is obtained:

$$f \approx v$$

wherein v is the velocity of an elastic wave.
On the other hand, the following relational expression is also established:

$$E = \rho v^2$$

$$\approx \rho \times f^2$$

For example, if a deviation of f is 0.3%, e.g., the respective frequencies are 1000 Hz and 1003 Hz, assuming that the length of the vibrator is the same, then the deviation of E is 0.6%, i.e., it corresponds to a difference between 1 and 1.006.

Figure 7:
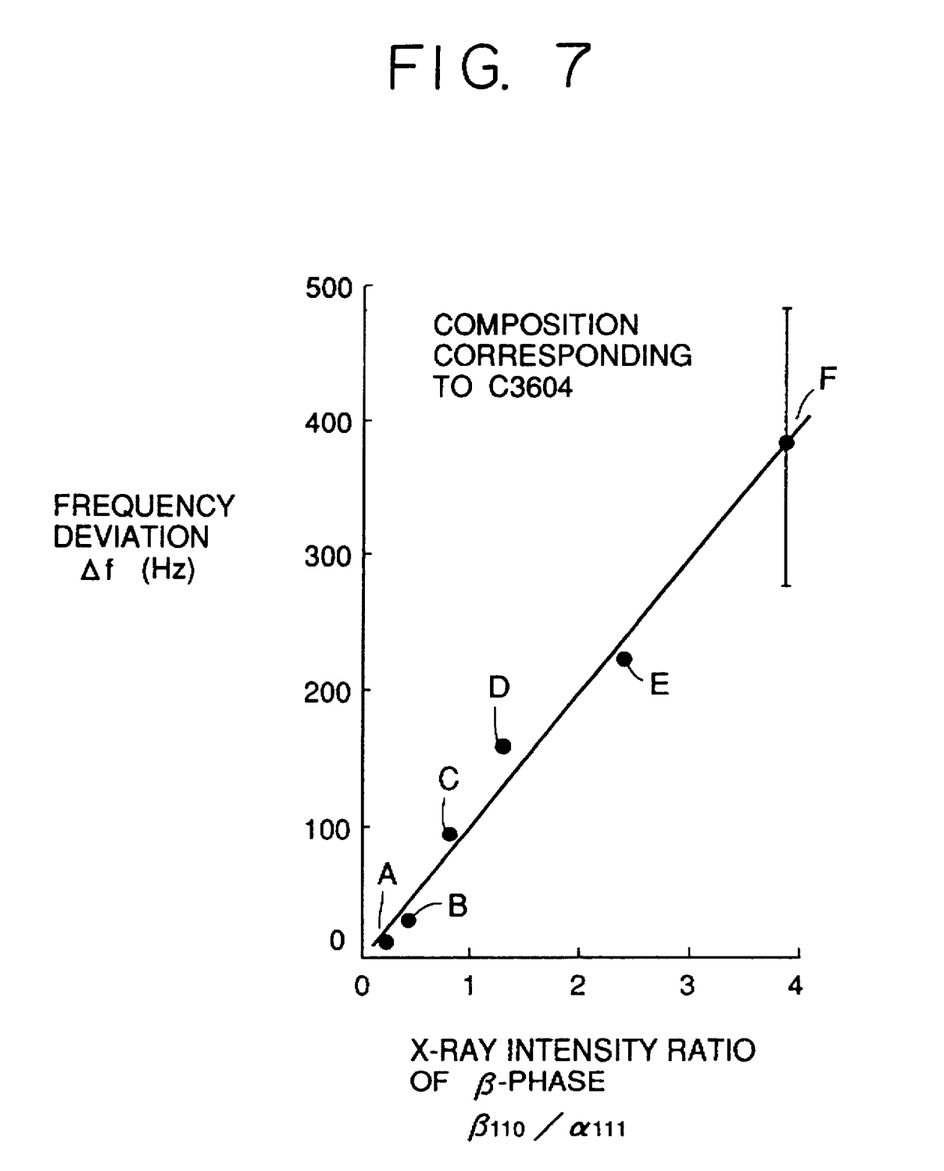
FIG. 7 is a graph showing a relation between the $\beta$ (110 orientation) peak height ratio measured by an X-ray reflection method and the frequency deviation, which was determined by measuring sections of various brass materials.

Samples of a free-cutting brass material other than the high tensile brass used as a comparative sample and the free-cutting brass of this embodiment were produced by various processes. X-rays were applied to a section of each of the samples, and the crystal orientation was determined by measuring the intensity of reflected rays. The peak heights of two orientations of (α-phase (face-centered cube) and the peak height of the β-phase (body-centered cube) were measured using an X-ray diffractometer. FIG. 7 is a graph showing a relation between the peak heights and the frequency deviation measured by the sounding method.

In FIG. 7, character A indicates a sample produced by hot-extruding an 8-inch billet to an external diameter of 50 mm and an internal diameter of 30 mm, and then repeatedly cold-drawing and completely annealing the sample nine times to an external diameter of 10.5 mm and an internal diameter of 3 mm. Character B indicates a sample produced by hot-extruding an 8-inch billet to a diameter of 20 mm and then repeatedly cold-drawing and completely annealing the sample three times to a diameter of 12 mm. Character C indicates a sample produced by hot-extruding a 6-inch billet to a diameter of 14 mm and then cold-drawing and completely annealing the billet to a diameter of 12 mm. Character D indicates a sample produced by hot-extruding an 8-inch billet to a diameter of 20 mm. Character E indicates a sample produced by hot-extruding a 6-inch billet to a diameter of 14 mm. Character F indicates a cast sample. The material of these samples corresponds to JISC 3604.

Figure 8:
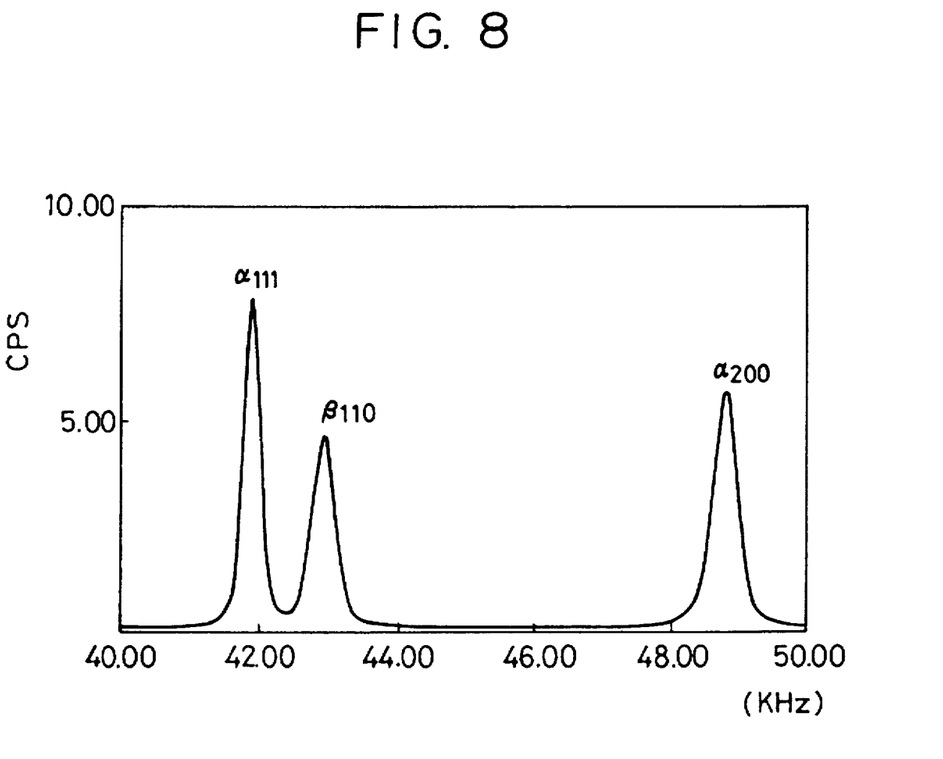
FIG. 8 is a chart showing the X-ray reflection intensity peaks measured by an X-ray reflection method.

FIG. 8 shows the X-ray intensity peaks of high tensile brass as an example, which were obtained by the X-ray diffractometer.

It is found from FIG. 7 that in order to obtain a natural frequency deviation of less than 150 Hz, which hardly affects the motor efficiency with a resonance frequency of about 50 KHz, i.e., in order to obtain a frequency deviation of 0.3% or less, the X-ray intensity ratio of the β-phase, $\beta_{110}/\alpha_{111}$, must be 1.5 or less.

This is possibly caused by the phenomenon that a material produced by repeatedly work hardening and recrystallization is brought nearer the equilibrium state, and the β-phase in the material is decreased. At the same time, the crystal grains become fine and spherical.

Figure 9:
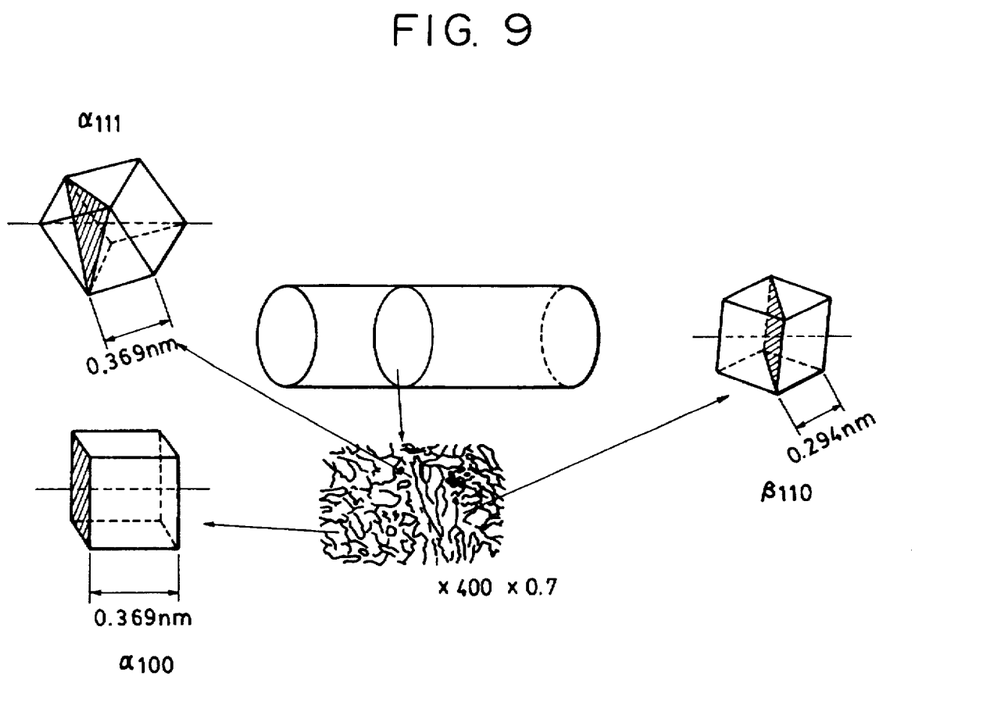
FIG. 9 is a schematic drawing illustrating crystal grains which form a brass material.

FIG. 9 is a schematic drawing illustrating the state wherein crystal grains having three kinds of Young's modulus corresponding to the above phases (α-phase and β-phase) and orientations are contained in a brass material. Assuming that crystal grains become excessively large, and that a material contains only three crystal grains respectively having the three kinds of Young's modulus, it can be estimated that the material exhibits a large frequency deviation and a large variation thereof. It can also be estimated that the frequencies of the material are well balanced by finely dispersing spherical crystal grains.

Figure 10:
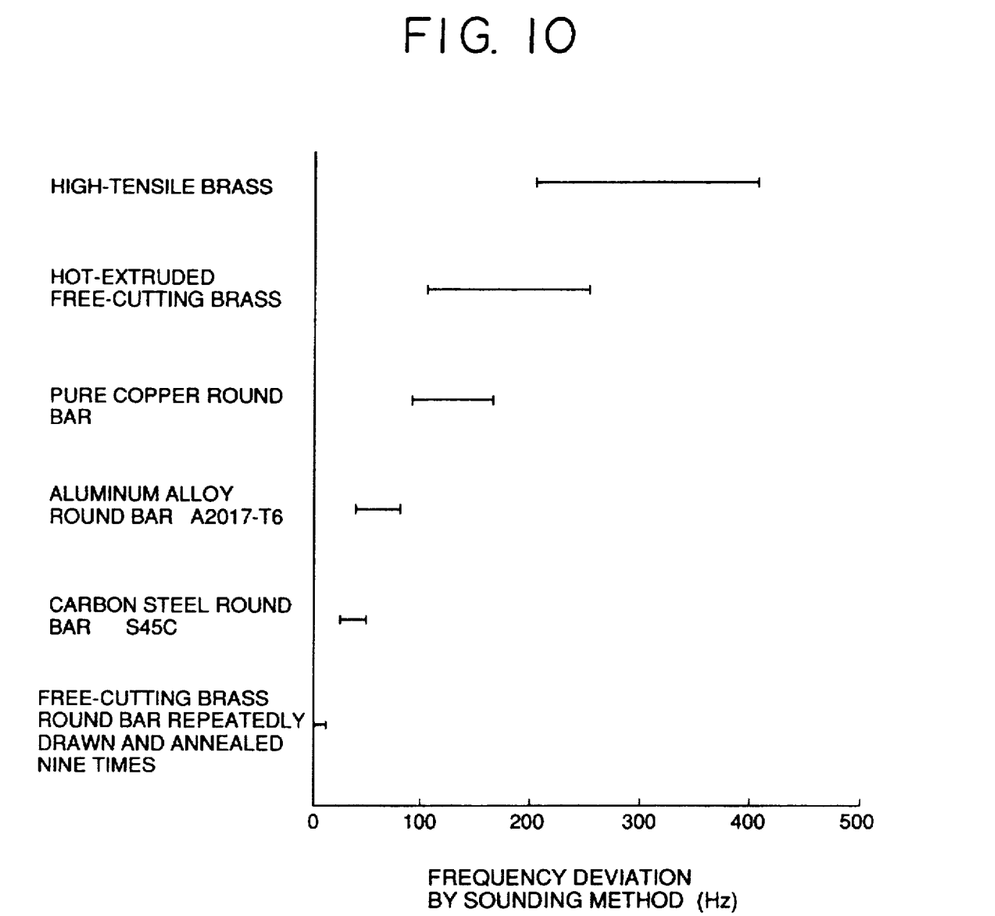
FIG. 10 is a graph showing the frequency deviations of various materials measured by the sounding method, and variations thereof.

FIG. 10 is a graph showing variations in frequency deviation of various materials measured by the sounding method using ten samples of each material in the dummy shape shown in FIG. 5. The materials used include high tensile brass, hot-extruded free-cutting brass, a pure copper round bar, an aluminum alloy round bar, a carbon steel (S45C) round bar and a free-cutting brass round bar (repeatedly drawn and annealed nine times). As shown in FIG. 10, the high tensile brass exhibits not only a large frequency deviation but also a large variation thereof.

FIG. 10 also shows that pure copper produces a frequency deviation. This is possibly caused by the presence of crystal grains having two types of Young's modulus corresponding to one α phase (111 orientation) and another α phase (100 orientation). On the other hand, carbon steel produces only a small frequency deviation. This is possibly caused by the characteristics of carbon steel that only the 110 orientation α-phase appears, and that even if carbon steel forms pearlite having an eutectoid structure with cementite, a fine structure can easily be obtained, as compared with brass or the like.

The material used for the vibrator is thus preferably free-cutting brass (repeatedly drawn and annealed several times), an aluminum alloy (repeatedly drawn and annealed several times) or carbon steel.

Although the above embodiment relates to an ultrasonic motor of the type in which a rotational movement is formed in the vibrator by combining bending vibration modes, even in an ultrasonic motor of the type in that a rotational movement is formed in a vibrator by combining a longitudinal mode and a torsional mode, a deviation between the elastic modulus in the torsional direction and the elastic modulus in the longitudinal direction is set to 0.6% or less so that the natural frequencies (resonance frequencies) of the respective vibrations can be made substantially the same, as in the above embodiment.

Figure 12:
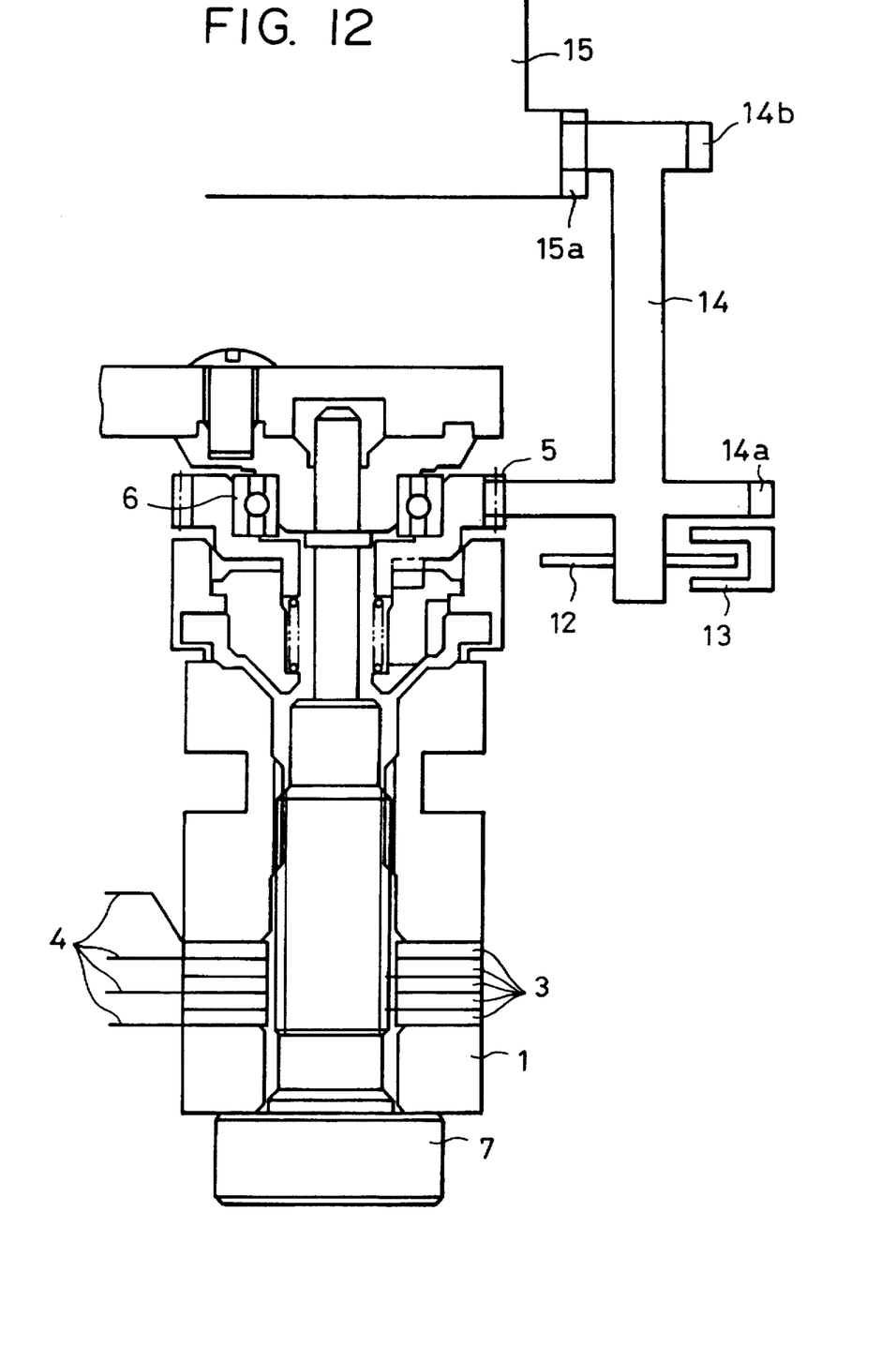
FIG. 12 is a schematic drawing illustrating an apparatus using as a driving source an ultrasonic motor of the present invention.

FIG. 12 shows an apparatus, e.g., an AF driving mechanism of a camera, using as a driving source the ultrasonic motor shown in FIG. 1. In FIG. 12, the large gear 14a of a gear 14 coaxially having the large gear 14a and a small gear 14b is engaged with an output gear 5 on the ultrasonic motor side, and the small gear 14b is engaged with a gear 15a of the rotational barrel 15 of a lens barrel. This causes the rotational barrel 15 to be rotated by rotation of the ultrasonic motor through the gear 14, for example, causing a focus lens (not shown) to be moved. On the other hand, a pulse plate 12 is fixed to the gear 14 so that the rotation of the pulse plate 12 caused by rotation of the gear 14 is detected by a photocoupler 13. The detected information is transmitted to an AF control circuit (not shown) which controls the drive of the ultrasonic motor so as to perform AF control.

As described above, the present invention uses a vibrator material exhibiting a small deviation in elastic modulus between vibrations synthesized therein, for example, vibrations in the longitudinal mode and in the torsional mode, or vibrations in two bending modes, so that the natural frequencies resonance frequencies) of the vibrations excited in the vibrator can be made substantially the same. There ms thus no need for any additional mechanical working, for example, for providing an external load to the vibrator, in order to match the resonance frequencies of each product, thereby providing a motor with a high efficiency. In particular, the present invention enables mass production of ultrasonic motors having the same performance.

Although the present invention has been described with respect to several specific embodiments and applications, it is not limited thereto. Numerous variations and modifications readily will be appreciated by those skilled in the art and are intended to be included within the scope of the present invention, which is recited in the following claims.

What is claimed is:

1. A vibration driven actuator or a vibration driven system using the actuator as a driving source, the actuator comprising a metallic vibrating member for generating therein a plurality of vibration waves having respective directions, and being formed of a metallic material having an elastic modulus deviation of 0.6% or less between respective vibration directions.

2. A vibration driven actuator or a system according to claim 1, wherein said vibration waves generated in said vibrating member are caused by vibrations in a longitudinal mode and in the torsional mode.

3. A vibration driven actuator or a system according to claim 1, wherein said vibration waves generated in said vibrating member are caused by respective vibrations in two bending modes.

4. A vibration driven actuator or a system according to claim 1, wherein said vibrating member is annealed a plurality of times.

5. A vibration driven actuator or a system according to claim 1, wherein said vibrating member is repeatedly annealed and cold-drawn.

6. A vibration driven motor or actuator comprising:
   a metallic vibrating member for generating a plurality of vibrations having a phase difference in time therebetween in a plurality of planes, said vibrating member being formed of a metallic material having an elastic modulus deviation of 0.6% or less between respective vibration directions; and
   a rotor arranged to be rotated by the vibrations generated in said vibrating member.

7. A motor or actuator according to claim 6, wherein said vibrating member is annealed a plurality of times.

8. A motor according to claim 6, wherein said vibrating member is repeatedly annealed and cold-drawn.

9. A vibration driven actuator or a vibration driven system using the actuator as a driving source, the actuator comprising:
   a vibrating member formed of a metallic material having an elasticity in each of a plurality of directions; and
   electro-mechanical energy converting means for generating a respective plurality of vibration waves in said vibration member in said plurality of directions;
   wherein there is substantially no elastic modulus deviation in the elasticity of the material between the respective plurality of directions in the vibration member.

10. A vibration driven actuator or a system according to claim 9, wherein said electro-mechanical energy conversion means generates vibrations in a longitudinal mode and vibrations in a torsional mode which combine to generate said plurality of vibration waves.

11. A vibration driven actuator or a system according to claim 9, wherein said electro-mechanical energy conversion means generates vibrations in two bending modes which combine to generate said plurality of vibration waves.

12. A vibration driven actuator or a system according to claim 9, wherein said vibrating member is annealed a plurality of times.

\* \* \* \* \*

UNITED STATES PATENT AND TRADEMARK OFFICE
CERTIFICATE OF CORRECTION

PATENT NO. : 5,594,291
DATED : January 14, 1997
INVENTOR(S) : JUN TAMAI, ET AL.

Page 1 of 2

It is certified that error appears in the above-indentified patent and that said Letters Patent is hereby corrected as shown below: Title page, item:

[56] References Cited

FOREIGN PATENT DOCUMENTS

"4091670" should read --4-91670--.

COLUMN 4

Line 4, "excessive" should read --excessively--.
Line 23, "free-cutting" should read --free-cutting brass;--.

COLUMN 6

Line 10, "stiff." should read --stiff direction.--.
Line 11, "two the" should read --the two--.
Line 29, "in accuracies" should read --inaccuracies--.
Line 52, "f≡v" should read --f∝v--.
Line 59, "≡pxf$^2$" should read --∝pxf$^2$--.

UNITED STATES PATENT AND TRADEMARK OFFICE
CERTIFICATE OF CORRECTION

PATENT NO. : 5,594,291

DATED : January 14, 1997

INVENTOR(S) : JUN TAMAI, ET AL.

It is certified that error appears in the above-indentified patent and that said Letters Patent is hereby corrected as shown below:

COLUMN 8

Line 40, "resonance" should read --(resonance--.
Line 41, "ms" should read --is--.

Signed and Sealed this

Fifteenth Day of July, 1997

Attest:

Attesting Officer

BRUCE LEHMAN

Commissioner of Patents and Trademarks